United States Patent [19]
Hogan et al.

[11] 3,723,717
[45] Mar. 27, 1973

[54] METHOD AND APPARATUS TO EFFECT NORMALIZED CORRELATION

[75] Inventors: James J. Hogan, Akron; Thoedore W. Iler, Tallmadege, both of Ohio

[73] Assignee: Goodyear Aerospace Corporation, Akron, Ohio

[22] Filed: July 26, 1971

[21] Appl. No.: 166,153

[52] U.S. Cl...............235/181, 178/50, 179/15 A, 235/197, 315/10
[51] Int. Cl...........................G06g 7/19, H01n 5/30
[58] Field of Search........235/181, 183, 197; 315/10, 315/11, 12; 343/5 MM; 324/77 G, 77 K, 77 T

[56] References Cited

UNITED STATES PATENTS

| 3,617,801 | 11/1971 | Hogan | 315/10 |
| 3,566,019 | 2/1971 | Kock | 315/11 X |
| 3,349,231 | 10/1967 | Harmon | 235/181 |
| 3,004,707 | 10/1961 | Wilson | 235/183 |

*Primary Examiner*—Felix D. Gruber
*Attorney*—J. G. Pere et al.

[57] ABSTRACT

An electronic area correlator is pulsed into cut-off and uniform transmission modes to provide a sequentially time-shared signal containing reference, correlation, and integral information. This time-shared signal is separated, demodulated, and electronically combined to provide a normalized output signal that readily identifies the correlation match-point.

10 Claims, 7 Drawing Figures

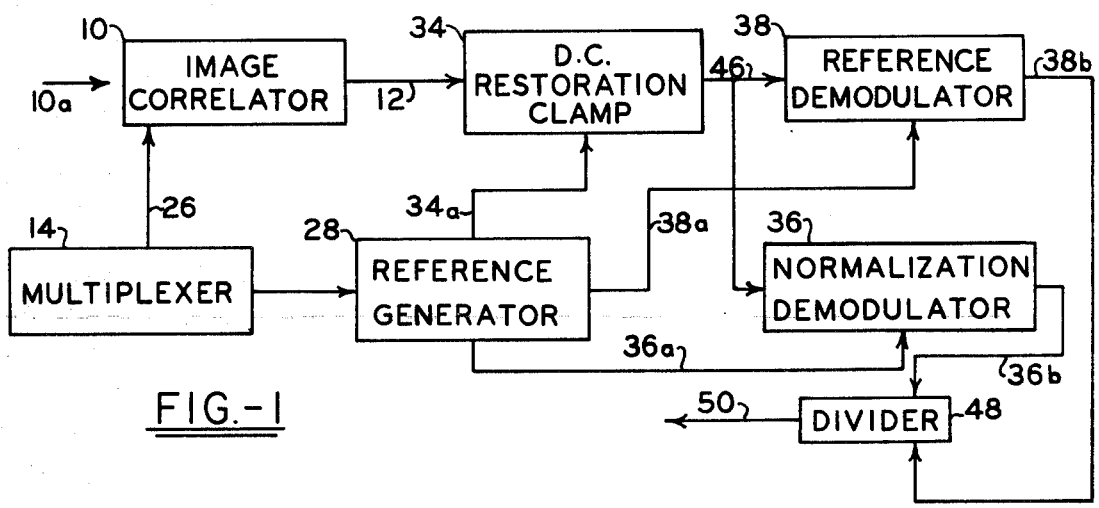
FIG.-1
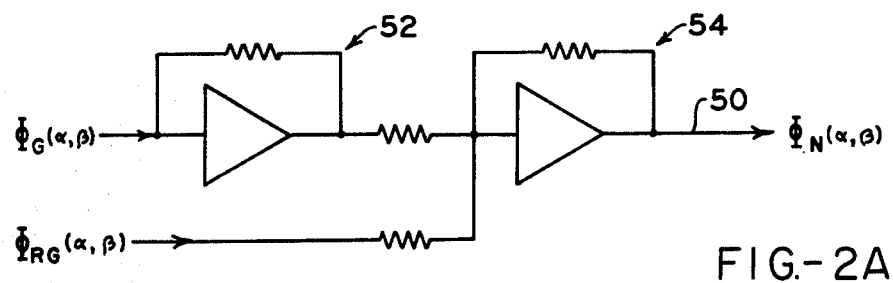
FIG.-2A
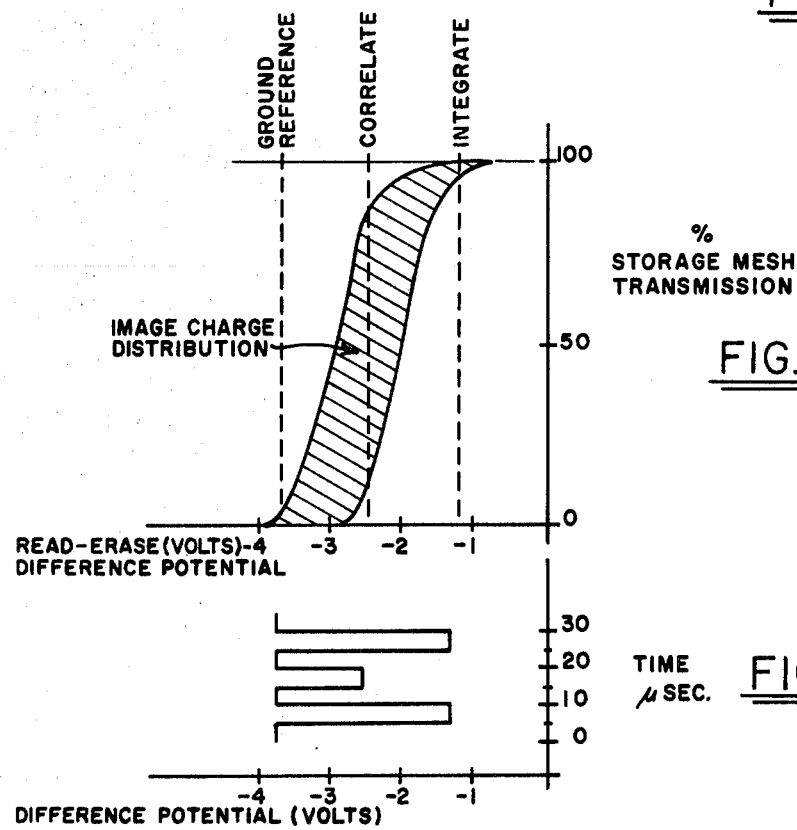
FIG.-4A
FIG.-4B

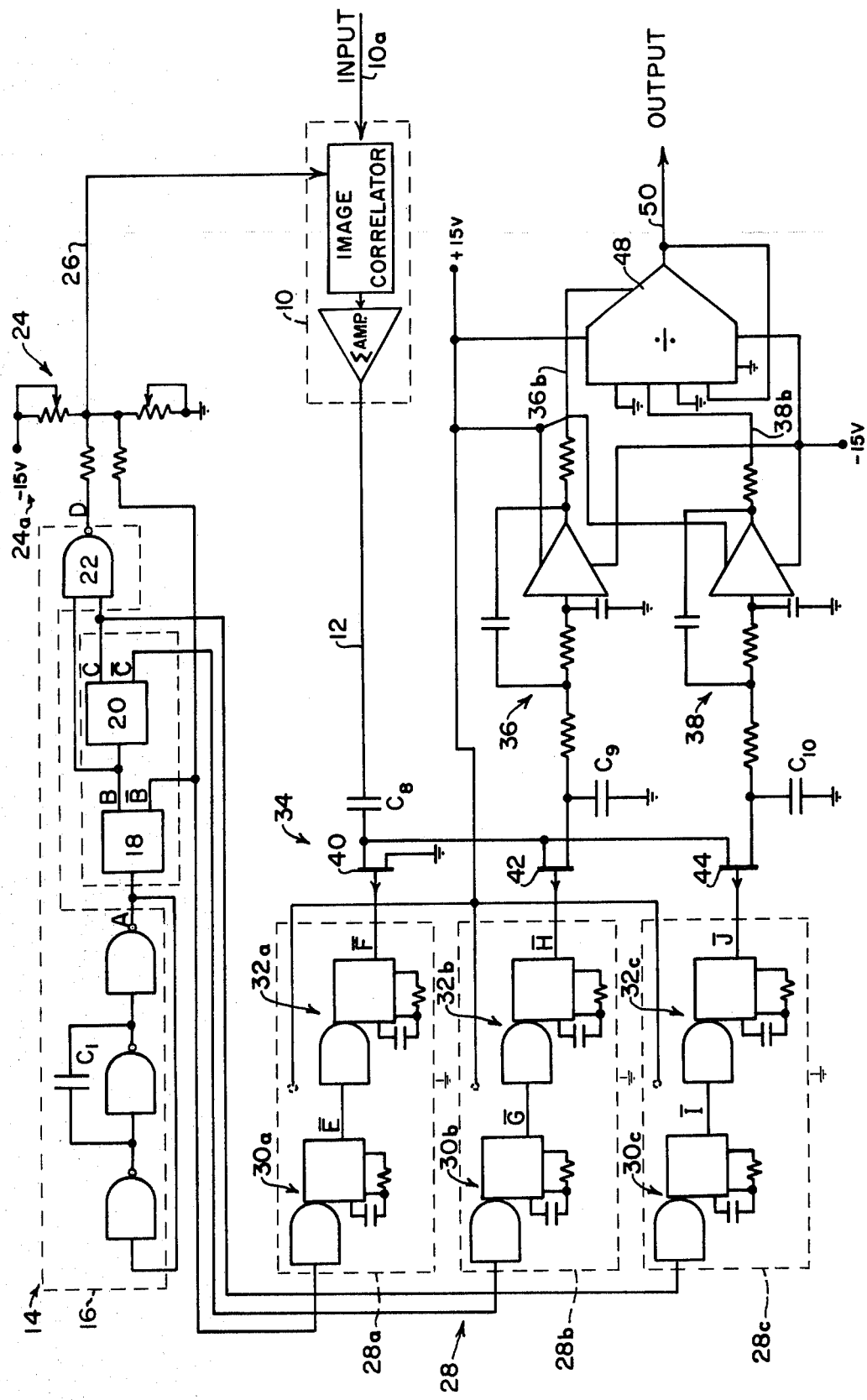

METHOD AND APPARATUS TO EFFECT NORMALIZED CORRELATION

BACKGROUND OF THE INVENTION

This invention generally relates to image correlation and more specifically to a method and apparatus for obtaining acceptable electronic area-correlation performance from a reduced-information signal.

Apparatus for electronically deriving a signal that is a function of the correlation between two images are generally known in the art. Devices of this type are in the form of electronic imaging tubes and one such device is the CORRELATRON, a product of Goodyear Aerospace Corporation, Akron, Ohio and described in any of numerous patents including U.S. Pat. Nos. 3,424,937 and 3,290,546.

The present invention utilizes the capabilities of image correlation devices of this type and provides improved performance by increasing the pattern recognition and tracking accuracy of the system.

Generally, the uniqueness and accuracy of correlating images is dependent upon the number of correlating elements and it is an object of the invention to reduce the number of correlating elements by a normalization technique and still maintain system performance and accuracy.

The invention implements an integral normalization technique wherein the finite area correlation result is operated upon by the integral of the input signal over the correlation aperture. In typical area correlation terminology the correlation function may be expressed as:

$$\Phi_{RG}(\alpha,\beta) = \int A \int R(x,y) \cdot G(x+\alpha, 4+\beta) \, dxdy$$

Where:
$R(X,Y)$ is the reference function;
$G(x+\alpha, y+\beta)$ is the ground scene projection on the reference function with displacement $\alpha$ and $\beta$; and
$A$ is the area of the correlating aperture.

In one implementation the correlation result $\Phi_{RG}(\alpha,\beta)$ is divided by the integral of the input signal and the normalized function is expressed as:

$$\Phi_N(\alpha,\beta) = \Phi_{RG}(\alpha,\beta)/\Phi_G(\alpha,\beta)$$

where
$\Phi_G(\alpha,\beta) = \int A \int G(x+\alpha,y+\beta) \, dxdy$ and is the integral of the input signal over the correlation aperture $A$.

In a second implementation the difference is taken between the correlation result $\Phi_{RG}(\alpha,\beta)$ and $\Phi_G(\alpha,\beta)$. In either case the normalized output $\Phi_N(\alpha,\beta)$ substantially improves correlation matchpoint identification.

Generation of the integral value of $G(x+\alpha, y+\beta)$ over the correlating aperture $A$ is readily accomplished in electronic image correlation tubes such as the CORRELATRON herebefore mentioned. The method of the invention involves pulsing the storage grid or photocathode of the tube into cut-off correlation and uniform-transmission modes wherein the cut-off mode is used to generate a reference while the uniform transmission mode produces the integral value. The resulting output signal is a sequentially time-shared signal containing the reference, correlation, and integral signals. This multiplex signal is subsequently separated, demodulated, and normalized in the apparatus of the invention.

DESCRIPTION OF THE DRAWINGS

The apparatus to carry out the method of the invention may be explained with reference to the accompanying drawings wherein:

FIG. 1 is a general block diagram illustrating the signal flow in the apparatus of the invention;

FIG. 2 is a detailed circuit diagram of the apparatus of FIG. 1;

FIG. 2A is a variation of the output circuit of FIG. 2;

FIG. 4A illustrates a graph of the transmission characteristics of storage mesh for various potentials;

FIG. 4B is a graphic illustration of the multiplexed pulse forms; and

DESCRIPTION OF THE PREFERRED EMBODIMENT

Figure 3:
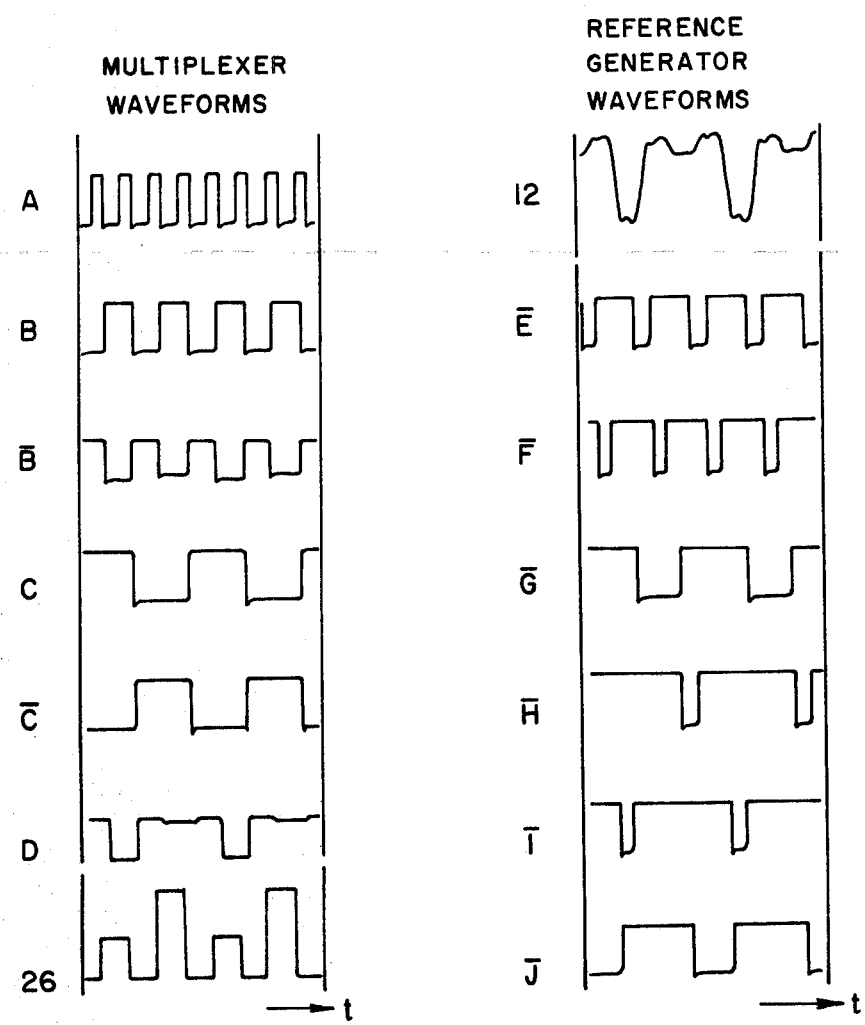
FIG. 3 illustrates the signal waveforms generated at respective points in the circuit of FIG. 2.

With reference to the drawings, an image correlator 10 is provided that electronically matches an input radiation image 10a to a reference electron image previously stored on the correlator storage grid and derives a signal that is a function of the product of the two images. The photocathode of the correlator 10 is pulsed to provide a multiplexed or sequentially time-shared output 12 containing reference, correlation, and integral signals. A typical image charge distribution for correlator 10 is illustrated in FIG. 4A wherein the multiplex signal generation is accomplished by a sampling sequence generated by applying an appropriate pulse to the photocathode or storage grid of the correlator 10 during the read mode.

The multiplexing technique of the instant invention is responsible for the ultimate achievement of the desired normalization. A genuine appreciation of the multiplexing technique may be had only with a thorough understanding of the operation of the correlatron as described in the above-mentioned U.S. Pat. No. 3,424,937. With this understanding, a continuing reference of FIG. 4 will illustrate the achievement of the normalization technique. It should be understood that the storage mesh or storage grid of the correlator 10 acts substantially as a plurality of capacitors each of which receives a charge dependent upon the photo image cast upon it by the photocathode of the correlator 10. The storage grid consequently has a non-uniform charge over the surface thereof dependent upon the particular image stored. With an image stored by means of the varying charges on the storage grid, the photocathode causes electron streams to pass from the photocathode towards the storage grid; the electron streams being dependent upon the radiation image 10a incident to the photocathode. Many of the electron streams from the photocathode will be repelled at the highly charged areas on the storage grid. However, many of the electrons from the photocathode will have sufficient potential to pass through the lowly charged areas of the storage grid and fall upon the anode of the correlator 10. The resultant current flow from the photocathode to the anode is, as is well understood by those skilled in the art, indicative of the degree of correlation between the image stored on the storage grid and the image sensed by the photocathode.

In normal operation, such as just described, there is a fixed bias voltage applied to the storage grid and a second fixed bias voltage applied to the photocathode so as to energize the same and allow electrons to be admitted therefrom upon the sensing of a radiation image or light source. It should now be understood that the storage grid will contain an electron charge pattern corresponding to light and dark areas of the photo image stored; the charges varying in porportion with the brightness or darkness of the image. Similarly, the photocathode emits electrons in proportion to the lightness or darkness of the radiation image 10a cast thereupon. If light areas on the photocathode result in a high emission of electrons and dark areas in a low emission and if light areas of a storage grid result in low charges thereon and dark images in high charges then it can be seen that when the radiation image 10a incident to the photocathode corresponds with the image of the storage grid then a large number of electrons will pass through the storage grid and onto the anode thus resulting in a peak current or voltage at the anode thus indicating a high degree of correlation.

It should of course be apparent that a particular problem will exist when the radiation image 10a cast upon the photocathode has light areas in registry with the light areas of the storage grid and also includes other light areas not corresponding with any light areas on the storage grid. As is understood by those skilled in the art, the peak output current or voltage at the anode of the correlator 10 will be the same for the correlation between such an input radiation image and the image on the storage grid as it will be for an input radiation image incident to the photocathode which is in total registry with the image on the storage grid. Hence, it can be seen that a problem arises in determining when a true exact match point is achieved. The technique of the instant invention, as particularly illustrated in FIG. 4, overcomes this problem.

With an understanding of the general function and operation of a correlator 10, the technique of FIG. 4 will now be discussed in detail. As mentioned above, a particular bias voltage is applied to the storage grid to what would be equivalent to one side of each of the individual capacitors comprising the storage grid. To store an image on the grid the voltage of the photocathode is raised to a read voltage of appropriate magnitude. The photocathode then emits electrons to the storage grid; the electron flow being dependent upon the light and dark areas on the photocathode as received from the image being viewed. The electrons emitted from the photocathode then call upon the storage grid causing the varying charges discussed hereinabove to be placed thereon. At this point in time the storage grid then appears as a plurality of individual capacitors each having a charge corresponding to the illumination of the particular point of the image being stored which each capacitor represents. Having so stored an image, the correlator 10 may go into its search or tracking techniques, as understood by those skilled in the art, where it searches for images corresponding with that stored on the storage grid. The normalized searching or tracking technique as taught by the instant invention requires the application to the photocathode of three separate and distinct voltage levels. As was mentioned hereinabove, a particular read voltage was applied to the photocathode to the purposes of storing the image on the storage grid. In the searching and tracking techniques voltages of higher levels than the read voltage are applied to the photocathode so as to properly energize that electrode and cause electron streams of corresponding potential to be cast toward the storage grid. These voltage applications of higher than the read voltage level are referred to as the erase voltages. It can be seen from FIG. 4 that if the read voltage had been of, for example, 12 volts then an erase voltage of 13 volts would result in a read-erase difference potential of −1 volt and correspondingly all the electrons emitted from the photocathode would be of sufficient energy level to pass through the storage grid and onto the anode thus resulting in a maximum output signal thereat. In the correlate mode of operation, an erase pulse of approximately 14.5 volts would be applied to the cathode thus resulting in a read-erase difference potential of approximately −2.5 volts. With this voltage on the photocathode it can be seen that the percentage of electrons passing from the photocathode through the storage grid will be dependent upon the charge distribution on the storage grid, that charge distribution being indicative of dark and light areas of the stored image. It can be seen from the transconductance curve of FIG. 4 that approximately 85 percent of the electrons incident to a light area on the storage grid will pass therethrough to the anode while only about 15 percent of the electrons incident to a dark area will pass therethrough. This, as is well known to those skilled in the art, is the typical correlating function of such correlators; that is, areas of the storage grid representing light areas will allow the passage of a large quantity of electrons and the passage will decrease to the point where totally dark areas will allow a passage of but few electrons. The third voltage level which is applied to the cathode is the ground reference signal and, for a read level of 12 volts, would be typically approximately 16 volts. Consequently the read - erase potential would be −4 volts and, as can be seen from FIG. 4, no electrons from the photocathode would have sufficient potential to pass through the storage grid.

With reference to the above related characteristic operation of the correlatron 10 in relation to the photocathode voltage, it is to be understood that if all other voltage levels in the system remain constant then the electron emissive characteristics of the photocathode increase with a decrease of the applied voltage. It should further be understood that the electron emissive characteristics of the photocathode are affected both by the bias voltage applied thereto and the radiation image 10a viewed by the cathode as is characteristic of all photocathodes.

The general technique of the instant invention should now be apparent. The ground reference signal level is applied solely for the purpose of ascertaining a reference output level from the correlatron corresponding to no electron transmission through the storage grid. The integrating voltage level is applied for purposes of determining the correlator aperture function, $\phi_G$, such function indicating the average value in the correlating aperture. In other words, since all electrons emitted from the photocathode G at this voltage level pass through the storage grid the output at the anode will be indicative of the summation of the resolvable elements incident to the photocathode at that instant in time. This output, which has been designated as $\Phi_G(\alpha,\beta)$, is of course indicative of the total summation of the light and dark areas contained on the photocathode. The correlating voltage is applied to the photocathode for purposes of ascertaining, through ordinary techniques, the degree of correlation between the radiation image 10a incident to the photocathode and that stored on the storage grid. The resulting output at the anode is the raw correlation function or $\Phi_{RG}(\alpha,\beta)$.

It can be seen then that the function $\Phi_G(\alpha,\beta)$ and the function $\Phi_{RG}(\alpha,\beta)$ have been acquired by means of multiplexing the voltage applied to the photocathode of the common correlator 10. A high voltage is applied to the photocathode for purposes of acquiring a ground reference level whereat few if any electrons penetrate the storage grid. A slightly lower voltage level is applied to the photocathode for purposes of correlating the image incident to the photocathode with that contained on the storage grid. A third voltage level, of lesser potential than either of the former two, is applied so as to allow all electrons emitted from the photocathode due to the image incident thereto to pass through the storage grid and onto the anode.

Of course, as is well understood by those skilled in the art, the multiplexing or pulsing need not be done at the photocathode but may indeed be done at the storage grid itself, in which case the photocathode would have a fixed bias voltage. It is only important that the multiplexing achieve a proper fluctuation of voltage potential between the bias voltage of the storage grid and the bias voltage of the photocathode.

Typical values of the pulse form and period of duration are illustrated in FIG. 4B; however, it should be understood that faster or slower speeds are deemed within the teachings of the invention. For example, in a guidance system where fast sampling speeds are the rule, 1 $\mu$sec pulses have been demonstrated. In other applications where speed is not a critical factor, speeds as slow as 100 $\mu$sec may be utilized.

A multiplexer 14, more specifically shown in FIG. 2, provides the sampling sequence illustrated in FIG. 4. In the multiplexer 14 a master clock 16 is formed using a QUAD two-input gate in a ring oscillator configuration where a single capacitor $C_1$ controls the frequency. This clock drives the toggle input of a first JK flip-flop 18 which forms the basic sampling interval (B and $\overline{B}$) shown in FIG. 3.

The output of the flip-flop 18 is a symmetrical square wave (B) which drives a second flip-flop 20 to provide a 2:1 frequency countdown. The output (C) of flip-flop 20, also a symmetrical square wave, along with the output (B) of Flip-Flop 18, drives a gate 22 to provide a 25 percent duty cycle. The gate output (D) is summed with the ($\overline{B}$) output of flip-flop 18 and a bias voltage 24a to generate the photocathode pulse 26 required to provide the multiplexed output signal 12. Waveforms for the photocathode pulse 26 and the multiplexed signal 12 are illustrated in FIG. 3. A resistive summer 24 is shown in this application, however, an appropriate operational amplifier will also meet the needs of the invention.

The multiplexer 14 also feeds a reference generator 28. Because of timing and need for independent adjustment, the reference generator 28 comprises three dual one-shot packages 28a, 28b, and 28c as shown in FIG. 2. The first one-shot 30a, 30b, and 30c in each package provides the desired delay while the second one-shot 32a, 32b, and 32c establishes the activation time of a DC restoration clamp 34 via line 34a and to demodulators 36 and 38 via lines 36a and 38a respectively. The NOT outputs of the generator one-shots are identified in FIG. 2 as $\overline{F}$, $\overline{G}$, $\overline{H}$, $\overline{I}$, and $\overline{J}$, and the waveforms for these signals are illustrated with reference to FIG. 3. DC restoration is accomplished by a keyed clamp and occurs through the use of negative polarity signals $\overline{F}$, $\overline{H}$, and $\overline{J}$ with P-channel FET's 40, 42 and 44.

The clamp 34 outputs a single polarity signal 46 to the demodulators 36 and 38. Normally, to eliminate loading of the clamp 34 by demodulators 36 and 38, a buffer amplifier would be used at the clamp output, but, by choosing the capacitors $C_9$ and $C_{10}$ smaller than the clamp capacitor $C_8$, no buffer amplifier is necessary at this point. Instead, the amplifier is combined in a sample-and-hold circuit to form second-order Butterworth low-pass filters to provide demodulation of the signals.

Demodulated output signals $\Phi_G(\alpha,\beta)$ and $\Phi_{RG}(\alpha,\beta)$ are provided on lines 36b and 38b from the respective demodulator circuits 36 and 38. These two signals are fed into a differential input multiplier/divider 48 wherein the reference $\Phi_{RG}(\alpha,\beta)$ is divided by $\Phi_G(\alpha,\beta)$, the integral of the input scene. Typical devices to perform the division operation are known in the art and one such device is a Burr-Brown differential input multiplier/divider, Model 4097/25.

An alternate method of obtaining a normalized output $\Phi_N(\alpha,\beta)$ is shown in FIG. 2A wherein the demodulated signal $\Phi_G(\alpha,\beta)$ is fed into a simple inverter 52 and the output combined with the demodulated reference $\Phi_{RG}(\alpha\beta)$ in a differential amplifier 54. In either case, division or subtraction, the normalized signal outputted on line 50 is an improvement in image correlation.

Figure 5:
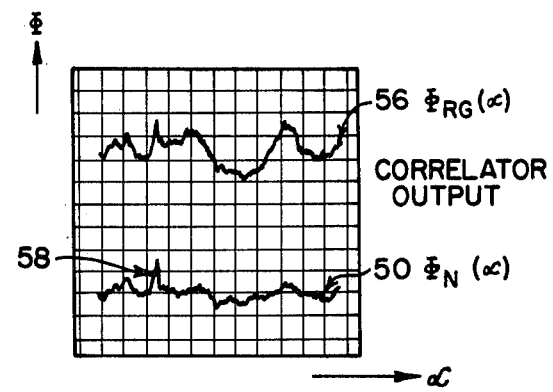
FIG. 5 shows the output waveforms for both normalized and unnormalized signals.

FIG. 5 shows the comparison between the waveforms for the unnormalized signal $\Phi_{RG}(\alpha)$ 56 and the normalized signal $\Phi_N(\alpha)$ 50. The signals are shown as a function of $\alpha$ assuming $\beta$ is constant. It is readily apparent that the unnormalized signal 56 provides a number of amplitude peaks which may or may not be the true match-point. In the case of the normalized output 50, no such discrepancies occur, for the true match-point is readily apparent at 58.

While in accordance with the patent statues only the best known embodiment of the invention has been illustrated and described in detail, it is to be particularly understood that the invention is not limited thereto or thereby, but that the inventive scope is defined in the appended claims.

What is claimed is:

1. A method to normalize the output of an electronic area image correlation system having an image correlator that converts an input radiation image into an electron image and cross-correlates said input with a stored electron image; the method comprising the steps of:

a. pulsing the image correlator sequentially into cutoff and uniform transmission to provide a timeshared output signal containing reference, correlation, and integral signal information;

b. electronically separating and demodulating the time-shared output of said correlator to provide a first signal $\Phi_{RG}$ indicative of the finite area correlation of the electron images, and a second signal $\Phi_G$ indicative of the integral value of the input radiation image over the correlating aperture; and c. electronically performing mathematical operations upon said first signal indicative of the finite area correlation and said second signal indicative of the integral value of the input radiation image to provide an output signal indicative of the correlation between the stored electron image and the input radiation image.

2. The method of claim 1 where in step (c) the second signal indicative of the integral of the input scene radiation image is electronically subtracted from the first signal indicative of the finite area correlation result.

3. The method of claim 1 wherein said first signal indicative of the finite area correlation is electronically divided by said second signal indicative of the integral value of the input radiation image.

4. In a system for correlating an input radiation image and a stored electron image, apparatus to effect normalized correlation comprising:

a. an electronic area image correlator to derive a first signal output that is a function of the correlation between the input and stored images, said signal characterized mathematically by $$\Phi_{RG}(\alpha,\beta) = \int A \int R(x,y) \cdot G(x+\alpha, y+\beta) \, dxdy$$

and to further derive a second signal output that is the integral of the input signal over the correlation aperture $A$, said signal characterized mathematically by $\Phi_G(\alpha,\beta) = \int A \int G(x+\alpha, y+\beta) dxdy$ where $R(x,y)$ is a reference function, $G(x+\alpha, y+\beta)$ is the ground scene projection on the reference with displacement $\alpha$ and $\beta$, and $A$ is the correlating aperture; and b. circuit means to electronically divide the first signal output $\Phi_{RG}(\alpha,\beta)$ by the second signal output $\Phi_G(\alpha,\beta)$ to provide a normalized output signal characterized mathematically by $$\Phi_N(\alpha,\beta) = \Phi_{RG}(\alpha,\beta) / [\int A \int G(x+\alpha, y+\beta) dxdy] \Phi_G(\alpha,\beta).$$

5. Apparatus of claim 4 wherein the circuit means electronically subtracts the second signal output from the first signal output to provide a normalized output signal characterized mathematically $\Phi_N(\alpha,\beta) = \Phi_{RG}(\alpha,\beta) - \Phi_G(\alpha,\beta)$.

6. Apparatus to effect normalized correlation of a pair of electron images comprising:

a. multiplexing circuit means providing output signals of predetermined characteristics;

b. an electronic area image correlator that derives a signal that is a function of the correlation of the pair of electron images, said correlator connected to accept the multiplexing circuit means output to be sequentially pulsed into cutoff and uniform transmission and to provide an output signal containing reference, correlation, and integral information;

c. first circuit means accepting the multiplexing circuit means and correlator outputs to separate and demodulate said correlator output to provide a pair of output signals, the first of said pair indicative of the finite area correlation of the electron images and the second of the pair indicative of the integral value of the input image over the correlating aperture; and d. second circuit means accepting the first circuit means outputs to electronically combine said signals to provide a normalized output signal that enhances the match-point correlation between the two images.

7. Apparatus according to claim 6 wherein the second circuit means comprises a divider circuit that electronically divides the first signal output of the first circuit means that is indicative of the finite area correlation, by the second signal output that is indicative of the integral value of the input image over the correlating aperture.

8. Apparatus according to claim 6 wherein the second circuit means comprises a subtracting circuit to subtract the second signal output indicative of the integral value of the input image from the first signal indicative of the finite area correlation result.

9. Apparatus according to claim 8 wherein the subtracting circuit comprises:

a. an inverting amplifier accepting the second signal output from the first circuit means to provide the negative value of the signal; and b. a differentiating amplifier accepting the first signal output of the first circuit means and the negative value of the second signal from the inverting amplifier to subtract said signals and provide an output signal indicative of the correlation of the two images.

10. Apparatus according to claim 6 wherein the multiplexing circuit means comprises:

a. an oscillator wherein a single capacitor controls the frequency of its square wave output signal (A);

b. a pair of J-K flip-flops, the first of the pair driven by the (A) output of the oscillator to form (B) and ($\overline{B}$) sampling interval outputs, and the second of the pair driven by the (B) output of the first to provide (C) and ($\overline{C}$) outputs for a 2:1 frequency countdown;

c. a gate driven by the (B) and (C) outputs of the J-K flip-flop pair to output a (D) signal providing a 25 percent duty cycle; and d. summing means connected to accept the ($\overline{B}$) output of the first J-K flip-flop and the (D) output of the gate to provide a sampling pulse to drive the image correlator into cutoff and uniform transmission.

* * * * *